United States Patent

Just et al.

[11] Patent Number: 5,443,296
[45] Date of Patent: Aug. 22, 1995

[54] WIND PROTECTOR FOR A PASSENGER VEHICLE WITH A REARWARDLY FOLDING TOP

[75] Inventors: Jan Just, Leonberg; Dieter Reuter, Ehningen, both of Germany

[73] Assignee: Dr. Ing. h.c.F. Porsche AG, Weissach, Germany

[21] Appl. No.: 313,809

[22] Filed: Sep. 28, 1994

[30] Foreign Application Priority Data

Sep. 28, 1993 [DE] Germany ............. 43 32 938.1

[51] Int. Cl.$^6$ ............................................. B60J 7/22
[52] U.S. Cl. ........................................ 296/107; 296/85; 296/180.1; 296/180.5
[58] Field of Search ............. 296/180.1, 180.5, 85, 296/107

[56] References Cited

U.S. PATENT DOCUMENTS 1,592,168  7/1926  Weidman .................. 296/85
1,784,279 12/1930  Ellerbeck .................. 296/107
4,838,604  6/1989  Kochi ..................... 296/180.5

FOREIGN PATENT DOCUMENTS

0394676A1 10/1990 European Pat. Off. .
0487843A1  6/1992 European Pat. Off. .
3935630A1  5/1991 Germany .
 0090817   4/1989 Japan ..................... 296/108
 2225992   6/1990 United Kingdom ........... 296/85

*Primary Examiner*—Dennis H. Pedder
*Attorney, Agent, or Firm*—Evenson McKeown Edwards & Lenahan

[57] ABSTRACT

A wind protector for a passenger vehicle with a rearwardly folding top can be displaced from an inoperative position to an operative position and vice versa. For increasing the operating comfort, it is provided that the wind protector is coupled with the top via a control device in such a manner that, when the top is folded rearward into the rearward-side deposited position, the wind protector is automatically moved into its operative position.

13 Claims, 4 Drawing Sheets

WIND PROTECTOR FOR A PASSENGER VEHICLE WITH A REARWARDLY FOLDING TOP

BACKGROUND AND SUMMARY OF THE INVENTION

The invention relates to a wind protector for a passenger vehicle with a rearwardly folding top, the wind protector being displaceable between operative and inoperative positions.

In a known arrangement of the initially mentioned type (U.S. Patent Document U.S. Pat. No. 4,838,604), a wind protector is arranged behind the two front seats in the passenger compartment and can be displaced manually by means of a swivel movement from an inoperative position into an operative position and vice versa.

It is an object of the invention to develop a wind protector of the initially mentioned type in such a manner that the operating comfort is increased and no more manipulations are required for moving the wind protector from the inoperative position into the operative position.

According to the invention, this object is achieved by means of an arrangement wherein the wind protector is coupled via a control device with the top in such a manner that the wind protector is automatically moved into its operative position when the top is folded rearward into its rearward-side deposited position.

The principal advantages achieved by means of the invention are that, as a result of the coupling of the wind protector to the top, when the top is folded rearward, the wind protector is automatically moved into its operative position and, when the top is closed, it is moved back into its inoperative position, whereby the operating comfort of the wind protector is increased significantly. The wind protector is coupled with the top via a control device. The control device may have a mechanical, hydraulic, electric, electronic or similar construction according to various contemplated embodiments of the invention.

In the embodiment shown, the control device is formed by two control arms which are connected with one another in an articulated manner and can be manufactured in a simple and low-cost fashion. In this case, one control arm is rigidly connected with a bearing journal of the wind protector, whereas the second control arm interacts rotatably with the first control arm and with the folding top linkage.

Other objects, advantages and novel features of the present invention will become apparent from the following detailed description of the invention when considered in conjunction with the accompanying drawings.

DETAILED DESCRIPTION OF THE DRAWINGS

Figure 1:
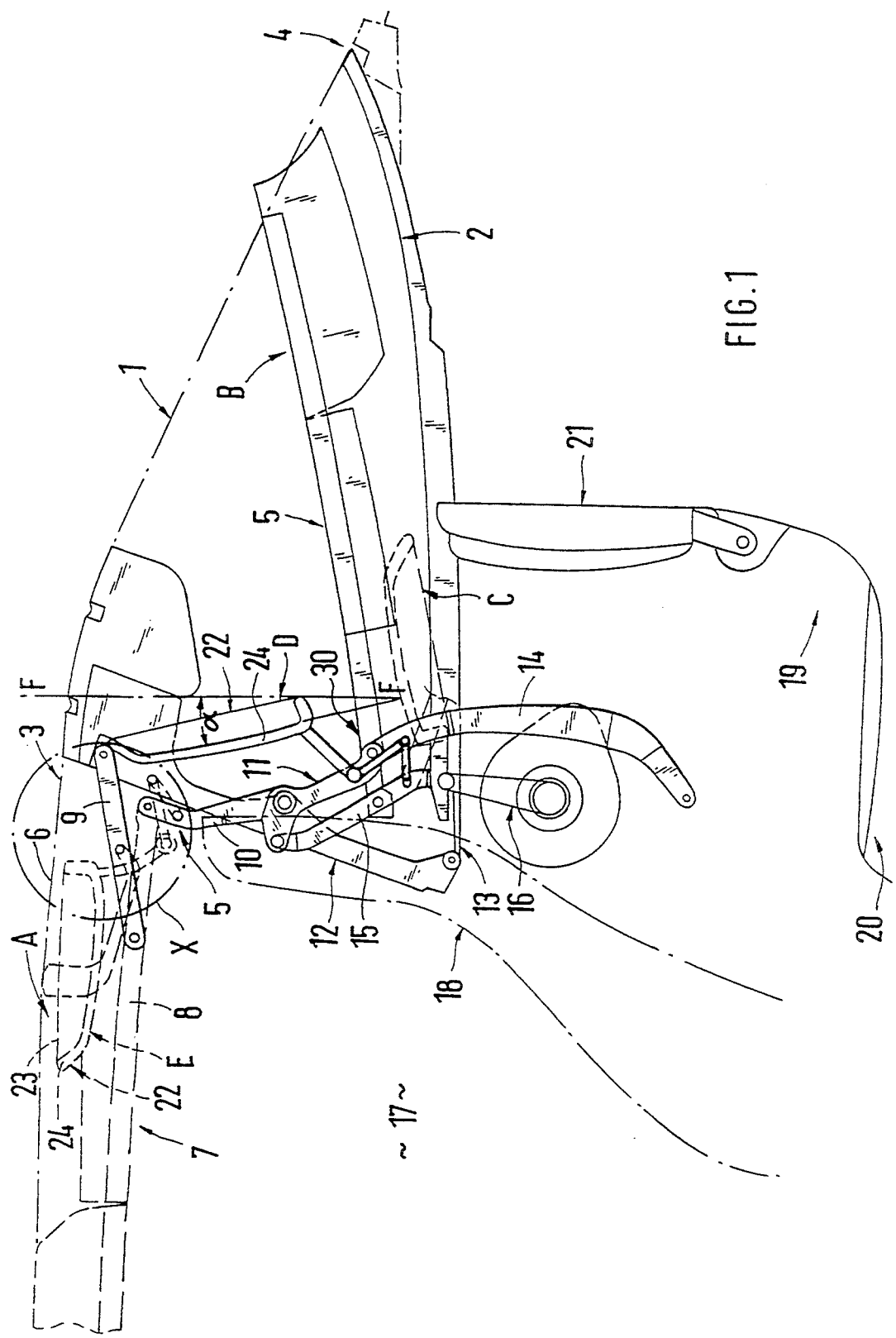
FIG. 1 is a partial lateral view of a convertible comprising a top and a wind protector constructed according to a preferred embodiment of the present invention.

The passenger vehicle 1 illustrated in FIG. 1 comprises a top 3 above a belt line 2 which can be moved from a closed position A rearward toward the rear into a rearwardly folded deposited position B and vice versa. In the deposited position B, the top 3 is situated slightly above the belt line 2 in a rear area 4. In the closed position A, the top 3 extends from a windshield frame not illustrated in detail to the rear area 4. In the embodiment shown, the top 3 is composed of a folding top linkage 5 and a folding top cover 6. In the illustrated area, the folding top linkage 5 has a roof frame 7 which is formed by lateral frame rails 8 and a transversely extending support which is not shown in detail and which extends adjacent to the upper windshield frame.

The frame rails 8, which are each constructed in one piece, are connected on both longitudinal sides of the vehicle. Each rail 8 is connected on the one side via a roof frame control arm 9, and on the other side, via a lever arm 10 of an angle lever 11, in an articulated manner with a main folding top pillar 12. On both longitudinal sides of the vehicle, the main folding top pillar 12 is in each case swivellably disposed on a folding top base 13 provided at the level of the belt line 2.

Also, the folding top linkage 5 comprises control arms 14, 15 which interact with the angle lever 11 and with a driving device 16.

In a passenger compartment 17 of the convertible, front seats 18 and a rear seat unit 19 are provided, only the backrest being shown of the front seats 18. The rear seat unit 19 comprises a seat part 20 and a swivellable backrest 21.

A wind protector 22 is provided so that the occupants situated in the front seats 18 are protected during the drive from undesirable draft air approaching from the rearward direction.

In the embodiment shown, the wind protector 22 is disposed on the folding top linkage 5 of the folding top 3. When the top 3 is closed, the wind protector 22 will extend at a narrow distance from the cover 6 of the top 3 disposed above it, in which case the wind protector 22 is aligned approximately in parallel to the top cover 6 (inoperative position E).

In the embodiment shown, the wind protector 22 is formed by a frame 24 provided with a covering 23. The covering 23 completely covers the area surrounded by the frame 24 and may be formed by an elastically deformable net, a transparent foil, a plate made of plastic, a glass or polyglass pane, or the like. The frame 24—viewed in the operative position D and from the rear—has an approximately rectangular, trapezoidal, oval or similar construction. In the cross-sectional view, the frame 24 may be formed by a tube or other profile.

In the operative position D, the wind protector 22 extends beyond the backrest of the seats 18 in the upward direction and extends preferably along the whole width of the interior of the passenger compartment 17. In addition, according to FIG. 1, the wind protector 22 is slightly sloped toward the front (angle alpha α) with respect to a perpendicular auxiliary plane F—F. However, the wind protector 22 may also be aligned to be approximately perpendicular.

On opposite lower corner areas 25 of the frame 24, angular bearing journals 26 are provided which engage, by means of outwardly directed end sections 27 in cylindrical receiving devices 28 of bearing blocks 29. The wind deflector 22 is connected via releasable plug connections with the two bearing blocks 29 arranged on the top side, whereby a simple and fast mounting and demounting of the wind protector 22 is achieved. Viewed in the closed position A of the top 3, each bearing block 29 is provided on a rearward end area 30 of the lateral frame rail 8 of the folding top linkage 5 and is connected with the underside of the frame rail 8 by means of fastening screws.

The possibility also exists that the wind protector 22 is formed by a frameless, transparent plate-shaped element which is fastened on its two longitudinal sides to the top via bearing elements.

According to the invention, it is provided that the wind protector 22 is coupled with the top 3 via a control device 31 in such a manner that, when the top 3 is folded rearward from a closed position A toward the rear into a rear-side deposited position B, the wind protector 22 is automatically moved into its operating position and vice versa; that is, the movement of the top kinematics which is required anyhow is utilized for moving the wind protector 22.

The control device 31 may have a mechanical, hydraulic, electric, electronic or similar construction.

In the embodiment shown, the control device 31, which is provided only on a longitudinal side of the top 3, has a mechanical construction and is formed by two control arms 32, 33 which are rotatably connected with one another, in which case the first control arm 32 is rigidly mounted on the wind protector 22, and the second control arm 33 is connected with the folding top linkage 5 and with the first control arm 32 in an articulated manner.

Viewed in the top view, the slightly longer first control arm 32 extends away at approximately a right angle from a horizontally aligned transversely extending area 34 of the bearing journal 26 and is constructed in one piece with it.

Figure 2:
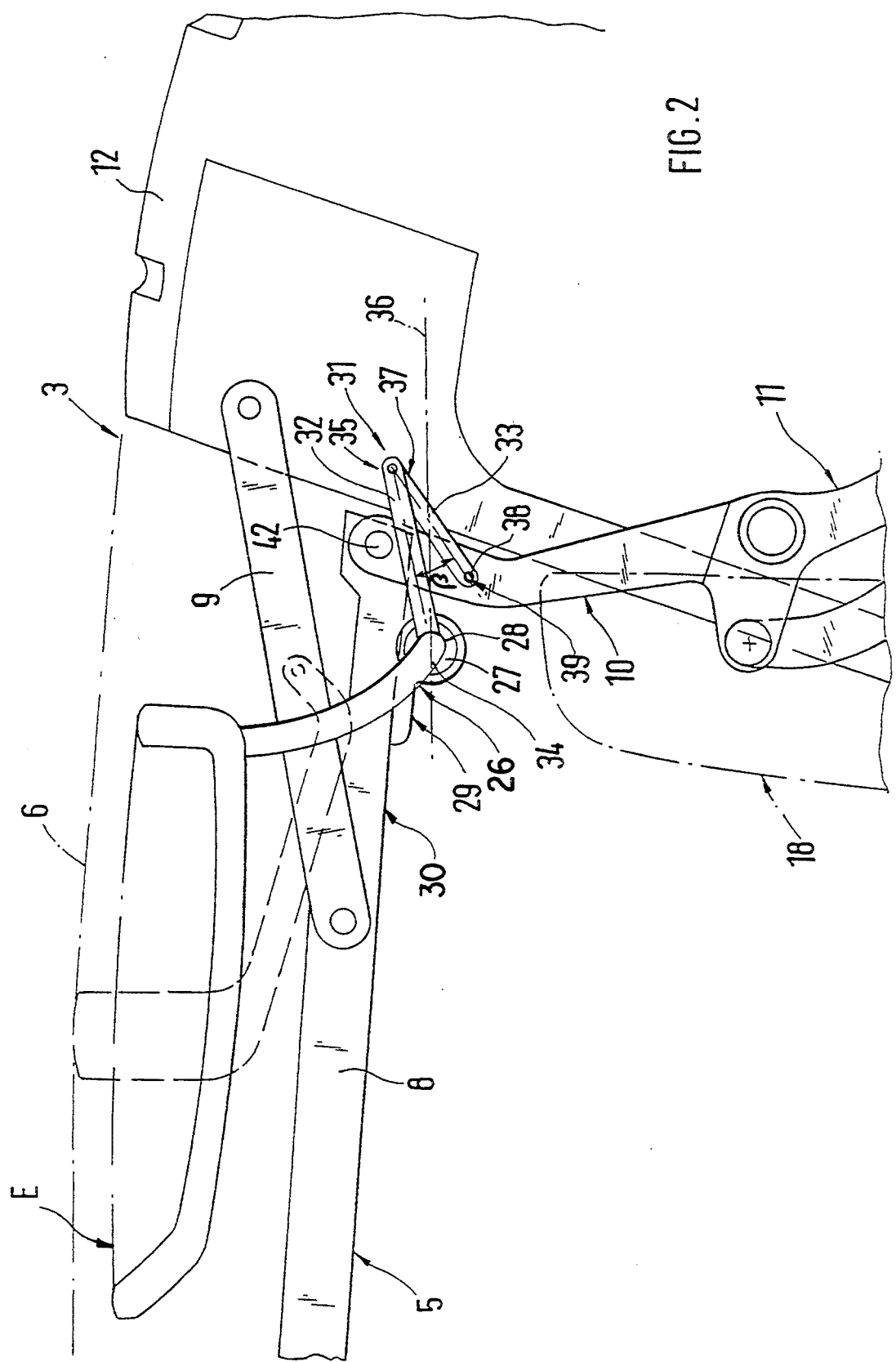
FIG. 2 is an enlarged view of a detail X of FIG. 1 which illustrates the control device arranged between the top and the wind protector, specifically when the top is closed.

In the closed position A of the top, the control arm 32 extends toward the rear and in this case is set slightly upward with respect to a horizontal auxiliary plane 36 (FIG. 2). A rearward end 35 of the control arm 32 is rotatably connected with an end 37 of the slightly shorter second control arm 33. The other end 38 of the second control arm 33 is connected by means of a plug-type connection 39 with the folding top linkage 5.

The plug-type connection 39 comprises a pin 40 which is set toward the outside and engages in a corresponding opening 41 of the angle lever 11 of the folding top linkage 5.

Figure 4:
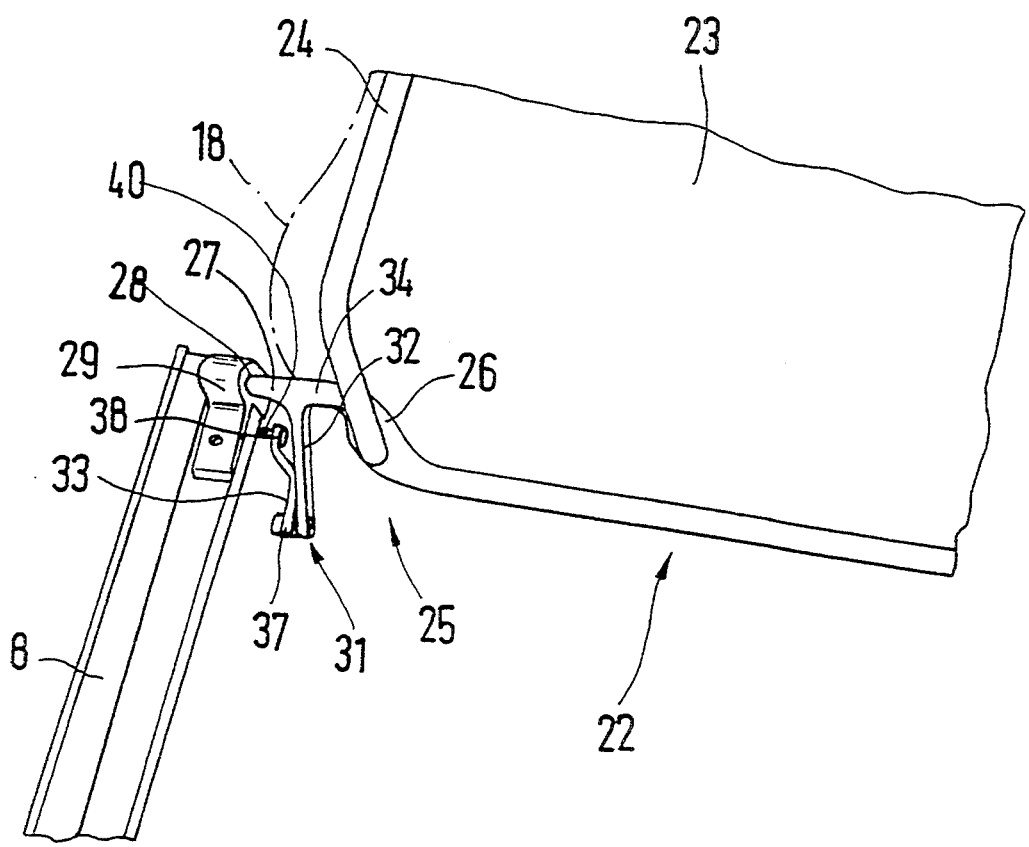
FIG. 4 is a partial view diagonally from the rear of the control device, the wind protector and the folding top linkage.

The opening 41 is provided at the lever arm 10 of the angle lever 11, specifically slightly below a hinge joint 42 of the frame rail 8 and the angle lever 11. In the closed position A of the top 3, the two control arms 32, 33 extend at an acute angle $\beta$ with respect to one another. In the top view, the two ends 37, 38 of the second control arm 33 extend at a lateral distance from one another; that is, control arm 33 has a right angle bend (FIG. 4).

Figure 3:
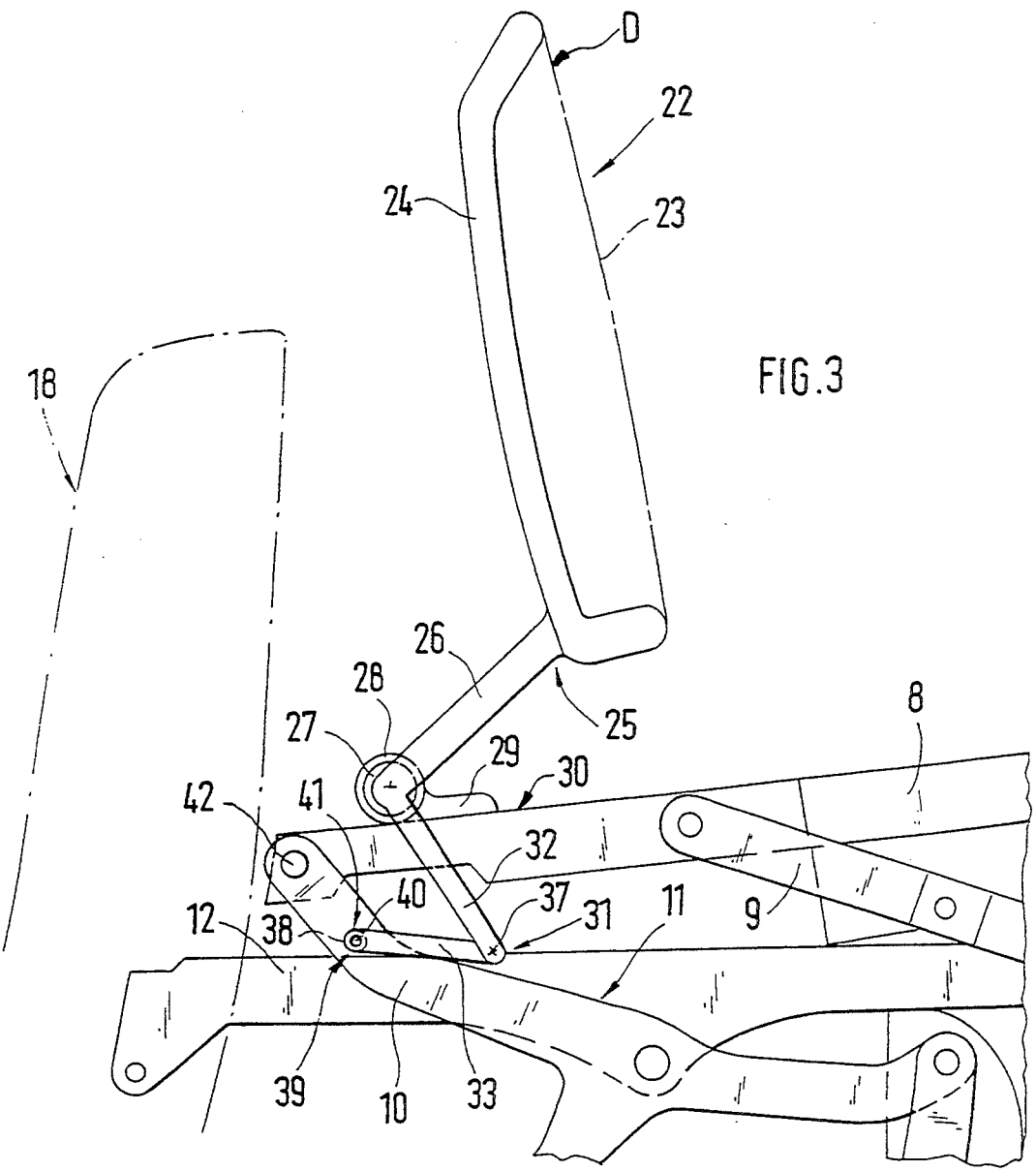
FIG. 3 is a view similar to FIG. 2 of the control device arranged between the top and the wind protector when the top is folded rearward.

When the top 3 is swivelled rearward into the rearward-side deposited position (B), the frame rails 8 and the main top pillar 12 are swivelled toward the rear and downward so that, being disposed above one another, they extend above the belt line 2 (FIG. 3). The angle lever 11 is also swivelled during this movement and, according to FIG. 3, extends approximately horizontally, whereas, when the top A is closed, it is aligned in the upright direction.

By means of the control arms 32, 33, which change their position with respect to one another when the folding top linkage 5 is swivelled rearward, the wind protector 22 is automatically moved into its operative position E and is locked in it.

The control device 31 may also be formed, for example, by a Bowden control, an electric drive, a toothed gearing or the like.

In the embodiment shown, the wind protector 22 is disposed on the folding top linkage 5. However, embodiments are also contemplated wherein the wind protector 22 is disposed on the stationary body and is connected with the top 3 by means of a control device 31.

It is important that, when the folding top 3 is folded rearward, the wind protector 22 is automatically moved via the control device 31 into its operative position and, when the folding top 3 is closed, is moved back into its inoperative position, in which case the movement of the folding top kinematics is utilized.

Via a coupling, which is not shown in detail and which is provided in the area of the bearing journal 26, it is possible to move the wind protector 22, when the top is open (deposited position B) from an operative position E downward into an inoperative position F.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A wind protector for a passenger vehicle with a rearwardly folding top, the wind protector being displaceable from an inoperative position to an operative position and vice versa, wherein the wind protector is coupled via a control device with the top in such a manner that the wind protector is automatically moved into its operative position when the top is folded rearward into its rearward-side deposited position, and wherein the control device is formed by a first control arm and a second control arm which are rotatably connected with one another, the first control arm being rigidly mounted on the wind protector, and the second control arm being rotatably connected in an articulated manner with the folding top linkage and with the first control arm.

2. A wind protector according to claim 1, wherein the control device exhibits one of a mechanical, hydraulic, electric, and electronic construction.

3. A wind protector according to claim 1, wherein the control device is provided only on one longitudinal side of the top between the wind protector and the top.

4. A wind protector according to claim 1, wherein the first control arm extends approximately at a right angle away from a horizontally aligned, transversely extending area of a bearing journal of the wind protector.

5. A wind protector according to claim 4, wherein the second control arm interacts via a plug-type connection with a lever arm of an angle lever of the folding top linkage.

6. A wind protector according to claim 5, wherein the plug-type connection is formed by an outwardly directed pin on the second control arm which is inserted into a corresponding opening of the angle lever.

7. A wind protector according to claim 1, wherein the wind protector is coupled with the folding top linkage via plug-type connections.

8. A wind protector according to claim 1, wherein the control device is provided only on one longitudinal side of the top between the wind protector and the top.

9. A wind protector according to claim 4, wherein the control device is provided only on one longitudinal side of the top between the wind protector and the top.

10. A wind protector according to claim 1, wherein the first control arm extends approximately at a right angle away from a horizontally aligned, transversely extending area of a bearing journal of the wind protector.

11. A wind pro,rector according to claim 10, wherein the second control arm interacts via a plug-type connection with a lever arm of an angle lever of the folding top linkage.

12. A wind protector according to claim 11, wherein the plug-type connection is formed by an outwardly directed pin on the second control arm which is inserted into a corresponding opening of the angle lever.

13. A wind protector according to claim 12, wherein the wind protector is coupled with the folding top linkage via plug-type connections.

* * * * *